US008110986B2

(12) United States Patent
Yukinobu et al.

(10) Patent No.: US 8,110,986 B2
(45) Date of Patent: Feb. 7, 2012

(54) DISPERSION-TYPE ELECTROLUMINESCENT ELEMENT AND METHOD FOR MANUFACTURING THE SAME

(75) Inventors: Masaya Yukinobu, Ichikawa (JP); Yuki Murayama, Ichikawa (JP); Hiroyuki Tanaka, Ichikawa (JP); Yasuo Tsukui, Nasukarasuyama (JP)

(73) Assignee: Sumitomo Metal Mining Co., Ltd. (JP)

( * ) Notice: Subject to any disclaimer, the term of this patent is extended or adjusted under 35 U.S.C. 154(b) by 182 days.

(21) Appl. No.: 12/308,815

(22) PCT Filed: Jun. 26, 2006

(86) PCT No.: PCT/JP2006/312739
§ 371 (c)(1),
(2), (4) Date: Dec. 26, 2008

(87) PCT Pub. No.: WO2008/001418
PCT Pub. Date: Jan. 3, 2008

(65) Prior Publication Data

US 2009/0278440 A1 Nov. 12, 2009

(51) Int. Cl.
*B32B 9/00* (2006.01)
*H01J 1/62* (2006.01)
*B05D 5/12* (2006.01)

(52) U.S. Cl. .......... 313/509; 313/506; 313/507; 445/24; 445/25; 427/66

(58) Field of Classification Search .................... 428/40, 428/323, 337; 313/498–512
See application file for complete search history.

(56) References Cited

U.S. PATENT DOCUMENTS

| | | | | |
|---|---|---|---|---|
| 6,605,341 | B2 * | 8/2003 | Tamai et al. | 428/212 |
| 6,611,097 | B1 | 8/2003 | Hanahara et al. | |
| 6,689,458 | B1 * | 2/2004 | Mikoshiba et al. | 428/339 |
| 2002/0098352 | A1 * | 7/2002 | Kishioka | 428/352 |
| 2005/0052128 | A1 * | 3/2005 | Nakanishi | 313/506 |
| 2009/0184637 | A1 * | 7/2009 | Yukinobu et al. | 313/509 |
| 2009/0302756 | A1 * | 12/2009 | Murayama et al. | 313/505 |

FOREIGN PATENT DOCUMENTS

| | | |
|---|---|---|
| JP | 61-211991 | 9/1986 |
| JP | 61211991 | 9/1986 |
| JP | 4-237909 | 8/1992 |
| JP | 5-36314 | 2/1993 |
| JP | 05036314 | 2/1993 |
| JP | 8-255521 | 10/1996 |
| JP | 2001-35652 | 2/2001 |
| JP | 2001-273831 | 10/2001 |
| JP | 2001-313164 | 11/2001 |
| JP | 2002-232537 | 8/2002 |

* cited by examiner

*Primary Examiner* — Anne Hines
*Assistant Examiner* — Tracie Green
(74) *Attorney, Agent, or Firm* — Gerald E. Hespos; Michael J. Porco

(57) ABSTRACT

A dispersion-type EL element formed on a thin or flexible transparent plastic film and a method for manufacturing the same are provided. The dispersion-type electroluminescent element is a dispersion-type electroluminescent element with at least a transparent conductive layer, a phosphor layer, a dielectric layer, and a rear electrode layer sequentially formed on a transparent plastic film surface, in which a thickness of the transparent plastic film is less than 50 μm, and the transparent conductive layer is formed by applying compression processing to an applied layer formed by applying a transparent conductive layer forming application liquid mainly composed of conductive oxide particles and a binder on the transparent plastic film surface and then, curing the compressed layer.

15 Claims, 1 Drawing Sheet

DISPERSION-TYPE ELECTROLUMINESCENT ELEMENT AND METHOD FOR MANUFACTURING THE SAME

BACKGROUND OF THE INVENTION

1. Field of the Invention

The present invention relates to a dispersion-type electroluminescent element obtained using a film with transparent conductive layer on which a transparent conductive layer mainly composed of conductive oxide particles and a binder is formed and a method for manufacturing the same and particularly to a dispersion-type electroluminescent element applied as a light-emitting element incorporated in a key input component of various devices such as a cellular phone and the like and a method for manufacturing the same.

2. Description of the Related Art

The dispersion-type electroluminescent element (hereinafter abbreviated as "dispersion-type EL element" in some cases) is a light-emitting element by alternating current driving and is used for a backlight and the like of liquid crystal display in a cellular phone, a remote controller and the like and an application to a light emitting element incorporated in a key input component (key pad) of various devices has been recently tried as a new usage.

Such a device includes, for example, a portable information terminal and the like such as a cellular phone, a remote controller, a PDA (Personal Digital Assistance), a laptop PC and the like, and the light emitting element is used with the purpose of facilitating a key input operation in a dark place such as during a night.

As the light emitting element of the key input component (key pad), a light emitting diode (LED) has been applied, but since there are problems such that the LED is a point light source, its brightness on a key pad portion is non-uniform and its appearance is poor, white/blue luminescent colors are generally preferred but those colors take a high cost in the LED, power consumption is larger than the dispersion-type EL element and the like, a trend to apply the dispersion-type EL element instead of the LED has become remarkable.

As a method for manufacturing such a dispersion-type EL element, the following methods are widely employed in general. That is, it is a method of sequentially forming a phosphor layer, a dielectric layer, and a rear electrode layer by screen printing and the like on a plastic film (hereinafter abbreviated as "sputtered ITO film") on which a transparent conductive layer of an indium tin oxide (hereinafter abbreviated as "ITO") is formed, using a physical film forming method such as sputtering, ion-plating and the like.

Here, as a paste used for applying (printing) formation of each layer of the phosphor layer, dielectric layer, and the rear electrode layer, phosphor particles, dielectric particles and conductive particles are dispersed, respectively, in a solvent containing a binder, and a commercial paste, for example, may be used.

The sputtered ITO film is formed so that a ITO single layer, which is an inorganic component, is formed on a transparent plastic film of polyethyleneterephthalate (PET), polyethylenenaphthalate (PEN) and the like by the above physical film forming method to have a thickness of approximately 20 to 50 nm, and a low resistance of approximately a surface resistivity: 100 to 300Ω/□ (ohm per square) is obtained.

However, since the ITO layer is an inorganic thin film and extremely fragile, a micro crack (split) can occur in the film, and in order to prevent that, a plastic film to be a base material needs to be provide sufficient strength and rigidity and its thickness is set at least at 50 μm or more, or usually 75 μm or more.

A PET film is now widely used for the base film of the above sputtered ITO film, but if its thickness is less than 50 μm, flexibility of the film is too high and a crack can easily occur in the ITO layer during handling, which extremely damages conductivity of the film. Thus, a thin sputtered ITO film with the thickness of approximately 25 μm, for example, has not been in a practical use. In the case of a soft base film made of urethane and the like, even if its film thickness is 75 μm or more, it can easily have a crack when the sputtered ITO layer is formed and has not been in a practical use.

Characteristics required when the dispersion-type EL element is applied to the keypad include, as described in Patent Document 1, for example, the above-mentioned uniformity in brightness and low power consumption and particularly, excellence in click feeling when the key pad is operated are important.

In order not to impair the click feeling when the dispersion-type EL element is incorporated in the key pad, the flexibility of the dispersion-type EL element itself needs to be sufficiently improved, that is, the thickness of the element is made as thin as possible or a flexible base film needs to be used.

However, if the dispersion-type EL element is manufactured using the above-mentioned sputtered ITO film, it is necessary to have a thickness of at least 50 μm or more for the base film in order to prevent a crack in the ITO layer so as to improve rigidity of the film, and the flexible base film cannot be used. Thus, there is a problem that the click feeling of the key operation is not sufficiently favorable, if the element is applied to the key pad.

As another problem different from the above, Patent Document 4, for example, points out breakage/failure of an LCD (liquid crystal) component and the like caused by static electricity generated at a key input of a cellular phone. Thus, a similar problem might also occur in a key input component of the dispersion-type EL element, and as a measure against it, there is a method in which a transparent conductive layer is formed on an outer surface of the dispersion-type EL element, for example so as to have the static electricity escape, but since the base film for the key pad has high flexibility as mentioned above, it can not be applied to the conventional sputtered ITO film. Also, it is not easy to form an inexpensive transparent conductive film satisfying durability (hitting durability), transparency, conductivity required for the key pad on the outer surface of the dispersion-type EL element.

Patent Document 1: Japanese patent Laid-Open No. 2001-273831

Patent Document 2: Japanese patent Laid-Open No. 4-237909

Patent Document 3: Japanese patent Laid-Open No. 5-036314

Patent Document 4: Japanese patent Laid-Open No. 2002-232537

SUMMARY OF THE INVENTION

The present invention was made in view of the above conventional circumstances and has an object to provide a dispersion-type EL element more excellent in flexibility than the dispersion-type EL element using a conventional sputtered ITO film or specifically to provide a dispersion-type EL element formed on a thin or flexible transparent plastic film and a method for manufacturing the same.

In order to achieve the above object, the inventors have conducted various examinations and found out that in the dispersion-type electroluminescent elements made of at least a transparent conductive layer, a phosphor layer, a dielectric layer, and a rear electrode layer sequentially formed on a surface of a transparent plastic film, by using a method of applying/forming the transparent conducive layer on the surface of the transparent plastic film not by the conventional physical film forming method but by using a transparent conductive layer forming application liquid, since the transparent conductive layer is mainly composed of conductive oxide particles and a binder matrix, easy occurrence of a crack in the transparent conductive layer during handling of the transparent conductive film, which extremely impairs its conductivity, can be suppressed, and by compression processing of an applied layer obtained by applying of the application liquid for forming transparent conductive layer, a packing density of the conductive particles in the transparent conductive layer is raised, scattering of light is lowered, and optical characteristics of the film is improved. In addition, the conductivity is drastically improved, the dispersion-type EL element more excellent in conductivity and flexibility than the dispersion-type EL element using the conventional sputtered ITO film can be provided inexpensively, and in the case of applying of the dispersion-type EL element to the key pad in the cellular phone and the like, favorable click feeling of a key operation can be obtained without any special structure or devising on the key pad, which leads to the present invention.

That is, the dispersion-type electroluminescent element according to the present invention is characterized in that a dispersion-type electroluminescent element made of at least a transparent conductive layer, a phosphor layer, a dielectric layer, and a rear electrode layer sequentially formed on a transparent plastic film surface, in which a thickness of the transparent plastic film is less than 50 μm and the transparent conductive layer is obtained by applying compression processing to an applied layer formed by applying a transparent conductive layer forming application liquid mainly composed of conductive oxide particles and a binder on the transparent plastic film surface and then, curing the compressed layer.

Also, another dispersion-type electroluminescent element according to the present invention is characterized in that a second transparent conductive layer is further formed on a back face (a face on which the transparent conductive layer is not formed) of the transparent plastic film on which the transparent conductive layer is formed, and the second transparent conductive layer is obtained by applying compression processing to a second applied layer formed by applying the transparent conductive layer forming application liquid mainly composed of conductive oxide particles and a binder on the back face of the transparent plastic film and then, curing the compressed layer, in which the thickness of the transparent plastic film is 25 μm or less, the conductive oxide particles contain any one or more of indium oxide, tin oxide, zinc oxide as main components, the conductive oxide particle with the indium oxide as the main component is an indium tin oxide particle, the binder has a cross-linking performance, the transparent conductive layer and the second transparent conductive layer have resistance against organic solvent, the compression processing is conducted by rolling processing of metal rolls, the above-mentioned dispersion-type electroluminescent element is applied as a light emitting element incorporated in a key input component of a device, and the device is a cellular phone, a remote controller, a portable information terminal.

Moreover, the method for manufacturing the dispersion-type electroluminescent element according to the present invention is a method for manufacturing a dispersion-type electroluminescent element in which at least a transparent conductive layer, a phosphor layer, a dielectric layer, and a rear electrode layer are sequentially formed on a transparent plastic film surface, characterized in that an applied layer is formed on the transparent plastic film surface using a transparent conductive layer forming application liquid mainly composed of conductive oxide particles and a binder and then, compression processing is conducted for the transparent plastic film on which the applied layer is formed and then, cured so as to form the transparent conductive layer, a second applied layer is further formed on a back face (face on which the transparent conductive layer is not formed) of the transparent plastic film on which the transparent conductive layer is formed using the transparent conductive layer forming application liquid mainly composed of the conductive oxide particles and the binder and then, compression processing is conducted for the transparent plastic film on which the transparent conductive layer and the second applied layer are formed and then, the compressed layer is cured so as to form a second transparent conductive layer.

Also, another method for manufacturing the dispersion-type electroluminescent element according to the present invention is a method for manufacturing a dispersion-type electroluminescent element in which at least a transparent conductive layer, a phosphor layer, a dielectric layer, and a rear electrode layer are sequentially formed on a transparent plastic film surface, characterized in that an applied layer is formed on the transparent plastic film surface using a transparent conductive layer forming application liquid mainly composed of conductive oxide particles and a binder, second applied layer is further formed on a back face (face on which the applied layer is not formed) of the transparent plastic film on which the applied layer is formed using the transparent conductive layer forming application liquid mainly composed of the conductive oxide particles and the binder and then, compression processing is conducted for the transparent plastic film on which the applied layer and the second applied layer are formed and then, the compressed layer is cured so as to form the transparent conductive layer and the second transparent conductive layer.

Further, another method for manufacturing the dispersion-type electroluminescent element according to the present invention is characterized in that the compression processing is conducted by rolling processing of metal rolls, and the rolling processing is conducted with a linear pressure 29.4 to 490 N/mm (30 to 500 kgf/cm).

Also, another method for manufacturing the dispersion-type electroluminescent element according to the present invention is characterized in that on a face opposite the face on which the dispersion-type electroluminescent element of a transparent plastic film on which the transparent conductive layer or the transparent conductive layer and the second transparent conductive layer are formed is formed, a release liner film (liner film that can be peeled off) on which a weak pressure-sensitive adhesive is applied is bonded and then, the dispersion-type electroluminescent element is formed and further, the release liner film is peeled off and removed.

EFFECT OF THE INVENTION

According to the present invention, by using a method in which dispersion-type electroluminescent element having at least a transparent plastic film and a transparent conductive layer, a phosphor layer, a dielectric layer, and a rear electrode layer sequentially formed on the transparent plastic film surface in which the transparent conductive layer is applied and formed on the transparent plastic film surface not using a conventional physical film forming method but using a transparent conductive layer forming application liquid, since the transparent conductive layer is mainly composed of conductive oxide particles and a binder matrix, easy occurrence of a crack in the transparent conductive layer during handling of a transparent conductive film, which remarkably impair its conductivity, is suppressed, and moreover, by applying compression processing to an applied layer obtained by the application of the transparent conductive layer forming application liquid, a packing density of the conductive particles in the transparent conductive layer is raised, optical characteristics of a film are improved by lowering scattering of light and moreover, the conductivity is drastically improved so that a dispersion-type EL element more excellent in conductivity and flexibility than the dispersion-type EL element using a conventional sputtered ITO film can be provided inexpensively. Moreover, if the above dispersion-type EL element is applied to a key pad of a cellular phone and the like, a favorable click feeling of a key operation can be obtained without any special structure or devising on the key pad, which is industrially advantageous.

DESCRIPTION OF THE REFERENCE NUMERALS

Figure 1:
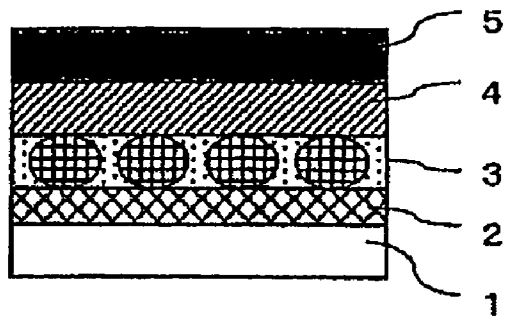
FIG. 1 is a sectional view illustrating a dispersion-type EL element with a basic structure according to the present invention.

1 transparent plastic film
2 transparent conductive layer
3 phosphor layer
4 dielectric layer
5 rear electrode layer
6 collecting electrode
7 insulating protective layer
8 second transparent conductive layer

DETAILED DESCRIPTION OF THE PREFERRED EMBODIMENTS

The dispersion-type electroluminescent element according to the present invention has at least a transparent conductive layer 2, a phosphor layer 3, a dielectric layer 4, and a rear electrode layer 5 sequentially formed on a transparent plastic film 1 as shown in FIG. 1.

Figure 2:
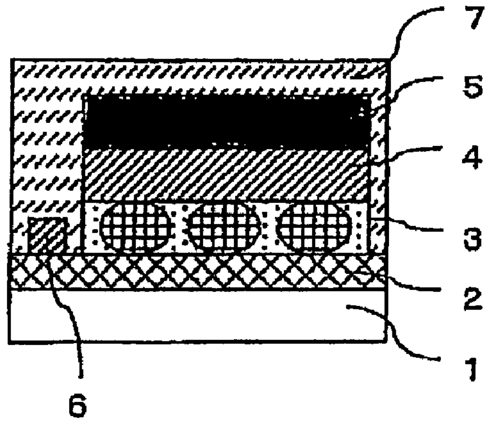
FIG. 2 is a sectional view illustrating a dispersion-type EL element with another structure according to the present invention.

Also, as an application to an actual device, as shown in FIG. 2, a collecting electrode 6 such as silver and the like and an insulating protective layer 7 are further formed for use in general.

The transparent plastic film used in the present invention preferably has a thickness of less than 50 μm. If the thickness of the transparent plastic film is 50 μm or more, rigidity of the film is raised, and if it is incorporated in the above-mentioned keypad as the dispersion-type EL element, a favorable click feeling can not be obtained.

Also, if the thickness of the transparent plastic film is preferably 25 μm or less, or more preferably 16 μm or less, a further favorable click feeling can be obtained, and since the total thickness of the dispersion-type EL element can be made as thin as 100 μm or less, for example, it is also preferable in a point that freedom in designing the device is improved.

Moreover, a material of the transparent plastic film is not particularly limited but various plastics can be used. Specifically, plastics such as polycarbonate (PC), polyethersulphone (PES), polyethyleneterephthalate (PET), polyethylenenaphthalate (PEN), polyethylene (PE), polypropylene (PP), urethane, nylon, fluorine resin and the like can be used but among them, use of a PET film is preferable from the viewpoint of its excellence in price, transparency, strength, and flexibility and the like.

Figure 3:
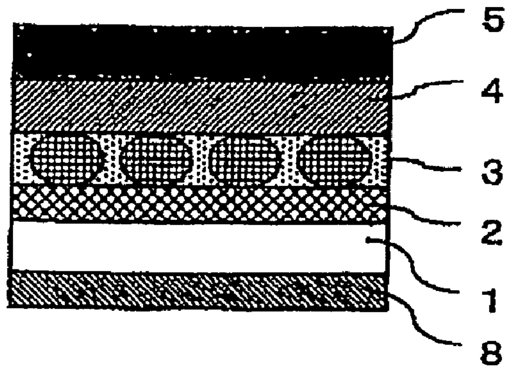
FIG. 3 is a sectional view illustrating a dispersion-type EL element with still another structure according to the present invention.

In the dispersion-type EL element according to the present invention, as shown in FIG. 3, a second transparent conductive layer 8 may be further formed on a face (back face) opposite the face on which the transparent conductive layer 2 is formed on the transparent plastic film 1.

The second transparent conductive layer has a purpose of preventing various adverse effects caused by static electricity and its resistance value may be much higher than the resistance value of the above-mentioned transparent conductive layer applied as an electrode of the dispersion-type EL element, and the value is preferably approximately $1M(1\times10^6)$ Ω/□ or less, for example.

The second transparent conductive layer is formed by forming a second applied layer by applying a transparent conductive layer forming application liquid in which conductive oxide particles are dispersed in a solvent containing a binder component on a transparent plastic film and then, compression processing applied to the second applied layer and then the compressed layer is cured, but from the viewpoint of preventing a drop of brightness of the dispersion-type EL element as much as possible, it preferably has a high transmittance, and thus, the film thickness is preferably 3 μm or less, or more preferably 1 μm or less.

A material of the binder used in the second transparent conductive layer is not particularly limited as long as it has a favorable adhesion with the transparent plastic film and has transparency and predetermined conductivity, and various resins may be used. Specifically, resins such as urethane, epoxy, polyester, fluorine resins and the like may be used. Among them, urethane and fluorine resins are preferable from the viewpoint of excellence in price, transparency, strength and flexibility and the like.

The transparent conductive layer mainly composed of the conductive oxide particles and the binder matrix formed on the transparent plastic film surface can be obtained by applying and drying using the transparent conductive layer forming application liquid in which the conductive oxide particles dispersed in the solvent containing the binder component on the transparent plastic film, and then, by applying compression processing to it together with the transparent plastic film and the curing the binder component.

The film (applied layer) before the compression processing obtained by applying and drying the transparent conductive layer forming application liquid is in a state where a large number of micro voids are formed between the conductive particles and the binder matrix. The voids are generated because a mixed amount of the binder component is small in the transparent conductive layer forming application liquid of the present invention (in the case of the conductive particles/binder component=90/10, for example), and close-packing of the conductive particles is difficult only by applying and drying the transparent conductive layer forming application liquid, and considerable voids are generated between the conductive particles and they can not be completely filled by the binder component.

Here, as the compression processing, the transparent plastic film having the applied layer on which the transparent conductive layer forming application liquid is applied/dried may be rolled by steel rolls, for example. In the present invention, the dispersion-type EL element is finally obtained with a structure having a rolling-processed transparent conductive layer on an extremely thin transparent plastic film surface, but in the rolling processing process, the rolling processing needs to be carried out carefully because a thin transparent plastic film is used, and a linear pressure of the rolling pressure of the steel rolls is preferably 29.4 to 784 N/mm (30 to 800 kgf/cm), more preferably 98 to 490 N/mm (100 to 500 kgf/cm), and further preferably 196 to 294 N/mm (200 to 300 kgf/cm). If the linear pressure is less than 29.4 N/mm (30 kgf/cm), an effect of improving the resistance value of the transparent conductive layer by the rolling processing is not sufficient, while if the linear pressure exceeds 784 N/mm (800 kgf/cm), a rolling facility would become large and the transparent plastic film might be distorted. Considering a price of the rolling facility and a balance among the characteristics of the transparent conductive layer by the rolling processing (transmittance, haze, resistance value), the value is preferably set as appropriate in a range of 98 to 490 N/mm (100 to 500 kgf/cm).

The rolling pressure (N/mm$^2$) in the rolling processing of the steel rolls is a value obtained by dividing a linear pressure by a nip width (width compressed by the steel rolls). The nip width is approximately 0.7 to 2 mm for a diameter of approximately 150 mm, though it depends on a diameter and a linear pressure of the steel rolls.

By the rolling processing, the packing density of the conductive particles in the transparent conductive layer can be improved to approximately a low value of 45 vol % or less to as high as 50 to 80 vol % (preferably 55 to 80%), for example, though it depends on the linear pressure as compared with the case without carrying out the rolling processing. The packing density exceeding 80 vol % seems to be difficult to be achieved, considering presence of the binder component contained in the transparent conductive layer forming application liquid and a physical filling structure of the conductive particles.

By carrying out such rolling processing, since the voids present in the film are shrunk and lost and the packing density of the conductive particles in the transparent conductive layer is raised, not only that the scattering of light is lowered and the optical characteristics of the film are improved but that the conductivity can be drastically raised.

The transparent plastic film is preferably applied with adhesion-promoting treatment, or specifically, primer treatment, plasma treatment, corona discharge treatment, short-wavelength ultraviolet irradiation treatment, silane coupling treatment and the like in advance.

The conductive oxide particles used in the transparent conductive layer forming application liquid are conductive oxide particles mainly composed of any one or more of indium oxide, tin oxide and zinc oxide and include, for example, indium tin oxide (ITO) particle, indium zinc oxide (IZO) particle, indium-tungsten oxide (IWO) particle, indium-titanium oxide (ITiO) particle, indium zirconium oxide particle, tin antimony oxide (ATO) particle, fluorine tin oxide (FTO) particle, aluminum zinc oxide (AZO) particle, gallium zinc oxide (GZO) particle and the like but not limited to them as long as transparency and conductivity are provided.

However, among them, ITO has the highest characteristics in a point that it has both a high visible-light transmittance and an excellent conductivity and it is preferable.

An average particle size of the conductive oxide particle is preferably 1 to 500 nm, and more preferably 5 to 100 nm. If the average particle size is less than 1 nm, manufacture of the transparent conductive layer forming application liquid is difficult and a resistance value of the obtained transparent conductive layer is high. On the other hand, if the size exceeds 500 nm, the conductive oxide particles easily sediments in the transparent conductive layer forming application liquid and its handling becomes difficult, and simultaneous achievement of both a high transmittance and a low resistance value in the transparent conductive layer becomes difficult.

The size of 5 to 100 nm is more preferable because it becomes possible to provide both the characteristics (transmittance, resistance value) of the transparent conductive layer and stability (sediment of the conductive particles) and the like of the transparent conductive layer forming application liquid in a well-balanced manner.

The average particle size of the conductive oxide particles is indicated by a value observed by a transmission electron microscope (TEM).

The binder component of the transparent conductive layer forming application liquid has a function to bind the conductive oxide particles together and to improve conductivity and strength of the film, a function to improve adhesion between the transparent plastic film and the transparent conductive layer, and a function to impart solvent resistance in order to prevent deterioration of the transparent conductive layer caused by an organic solvent contained in various printing pastes used for forming of the phosphor layer, dielectric layer, rear electrode layer and the like in a manufacturing process of the dispersion-type EL element. As the binder, an organic and/or an inorganic binder may be used and selected as appropriate, considering the transparent plastic film to which the transparent conductive layer forming application liquid is applied and film forming conditions and the like of the transparent conductive layer so that the above roles are satisfied.

To the above organic binder, thermoplastic resins such as acrylic resin, polyester resin and the like may be applied, but the binder preferably has solvent resistance in general, and for that purpose, it should be a cross-linkable resin, and it can be selected from thermosetting resin, cold-setting resin, ultraviolet-curable resin, electron-beam curable resin and the like. For example, the thermosetting resins include epoxy resin, fluorine resin and the like, the cold-setting resins include two-component epoxy resin, urethane resin and the like, the ultraviolet-curable resins include resins containing various oligomers, monomers, and photoinitiator and the like, and the electron-beam curable resins include resins containing various oligomers and monomers and the like but not limited to these resins.

The inorganic binders include binders mainly composed of silica sol, alumina sol, zirconia sol, titania sol and the like. For example, as the silica sol, a polymer obtained by adding water and acid catalyst to tetra-alkyl silicate for hydrolysis and dehydropolycondensation is made to progress or a polymer obtained by commercial alkyl silicate solution which has been already polymerized to tetramer to pentamer is further subjected to hydrolysis and dehydropolycondensation and the like may be used.

If the dehydropolycondensation has progressed too much, solution viscosity is raised and solidified in the end, and a degree of dehydropolycondensation is adjusted to an upper limit viscosity or less that can be applied on a transparent substrate. However, the degree of dehydropolycondensation is not particularly limited as long as it is a level not more than the above upper-limit viscosity, but considering film strength, weather resistance and the like, approximately 500 to 50000 in a weight-average molecular weight is preferable. Then, the alkyl silicate hydrolyzed polymer (silica sol) substantially completes dehydropolycondensation reaction (cross-linking reaction) at heating after applying and drying of the transparent conductive layer forming application liquid and becomes a hard silicate binder matrix (binder matrix mainly composed of silicon oxide). The dehydropolycondensation reaction starts immediately after drying of the film and as time elapses, the reaction solidifies the conductive oxide particles together firmly enough to an extent that they can not move, and if the inorganic binder is used, the above-mentioned compression processing needs to be conducted as soon as possible after applying and drying of the transparent conductive layer forming application liquid.

As the binder, an organic-inorganic hybrid binder may be used. For example, such binders include a binder obtained by modifying the above-mentioned silica sol with partially organic functional group and a binder mainly composed of various coupling agents such as a silane coupling agent and the like.

The transparent conductive layer using the above inorganic binder or the organic-inorganic hybrid binder inevitably has an excellent solvent resistance but it should be selected as appropriate so that adhesion with the transparent plastic film and flexibility of the transparent conductive layer and the like are not deteriorated.

A ratio between the conductive oxide particles and the binder component in the transparent conductive layer forming application liquid is, supposing that specific gravities of the conductive oxide particles and the binder components are approximately 7.2 (specific gravity of ITO) and approximately 1.2 (specific gravity of usual organic resin binder), respectively, in a weight ratio, is such that the conducive oxide particle: binder component=85:15 to 97:3, or preferably 87:13 to 95:5. The reason is that in the case of the rolling processing of the present invention, if the binder component is larger than 85:15, resistance of the transparent conductive layer becomes too high, while if the binder component is smaller than 97:3 on the contrary, strength of the transparent conductive layer is lowered and sufficient adhesion with the transparent plastic film can not be obtained.

The method for manufacturing the transparent conductive layer forming application liquid used in the present invention will be described. First, after the conductive oxide particles are mixed with a solvent and a dispersing agent as necessary, dispersing processing is applied so as to obtain a liquid with conductive oxide particles dispersed. As the dispersing agent, various coupling agents such as a silane coupling agent and the like, various polymer dispersing agents, various surfactants such as anionic, nonionic, cationic and the like can be cited. These dispersing agents can be selected as appropriate according to the type of the conductive oxide particle in use and dispersing processing method applied. Alternatively, even if no dispersing agent is used at all, depending on a combination of the conductive oxide particle and the solvent to be applied and the dispersing method, a favorable dispersing state can be obtained in some cases. Since the use of the dispersing agent might deteriorate the resistance value of the film or weather resistance, the transparent conductive layer forming application liquid without using the dispersing agent is the most preferable. As the dispersing processing, general-purpose methods such as ultrasonic processing, homogenizer, paint shaker, beads mill and the like may be applied.

By adding the binder component to the obtained liquid with conductive oxide particles dispersed, and moreover, by applying component adjustment of the conductive oxide particle concentration, solvent composition and the like, the transparent conductive layer forming application liquid is obtained. Here, the binder component is added to the liquid with conductive oxide particles dispersed, but it may be added in advance before the dispersing process of the conductive oxide particles and there is no particular restriction. The conductive oxide particle concentration may be set as appropriate according to the applying method (coating method) to be used.

A solvent used for the transparent conductive layer forming application liquid is not particularly limited but may be selected as appropriate depending on the applying method (coating method), film forming conditions, and a material of the transparent plastic film. For example, they include water, alcohol solvents such as methanol (MA), ethanol (EA), 1-propanol (NPA), isopropanol (IPA), butanol, pentanol, benzyl alcohol, diacetone alcohol (DAA) and the like, ketone solvents such as acetone, methyl ethyl ketone (MEK), methyl propyl ketone, methyl isobutyl ketone (MIBK), cyclohexanone, isophorone and the like, ester solvents such as ethyl acetate, butyl acetate, methyl lactate and the like, glycol derivatives such as ethylene glycol monomethyl ether (MCS), ethylene glycol monomethyl ether (ECS), ethylene glycol isopropyl ether (IPC), ethylene glycol monobutyl ether (BCS), ethylene glycol monoethyl ether acetate, ethylene glycol monobutyl ether acetate, propylene glycol monomethyl ether (PGM), propylene glycol ethyl ether (PE), propylene glycol methyl ether acetate (PGM-AC), propylene glycol ethyl ether acetate (PE-AC), diethylene glycol monomethyl ether, diethylene glycol monoethyl ether, diethylene glycol monobutyl ether, diethylene glycol monomethyl ether acetate, diethylene glycol monoethyl ether acetate, diethylene glycol monobutyl ether acetate, diethylene glycol dimethyl ether, diethylene glycol diethyl ether, diethylene glycol dibutyl ether, dipropylene glycol monomethyl ether, dipropylene glycol monoethyl ether, dipropylene glycol monobutyl ether and the like, benzene derivatives such as toluene, xylene, mesitylene, dodecyl benzene and the like, formamide (FA), N-methyl formamide, dimethyl formamide (DMF), dimethyl acetamide, dimethyl sulfoxide (DMSO), N-methyl-2-pyrolidone (NMP), γ-butyrolactone, ethylene glocol, diethylene glycol, tetrahydrofuran (THF), chloroform, mineral spirits, terpineol and the like, but not limited to them.

Next, a method for manufacturing the dispersion-type electroluminescent element according to the present invention will be described.

First, using the above transparent conductive layer forming application liquid, an applied layer is formed by applying and drying it on a transparent plastic film by a method such as screen printing, blade coating, wire-bar coating, spray coating, roll coating, gravure printing and the like and then, the above-mentioned compression processing is applied. The compression processing is preferably carried out by the rolling processing of metal rolls. After that, the applied layer which was applied with the compression processing is subjected to curing processing such as drying curing, heat curing, ultraviolet curing and the like according to the type of the application liquid so as to form the transparent conductive layer.

Also, prior to forming the above transparent conductive layer, at the same time or after that, as necessary, on the other face (back face) on which the transparent conductive layer of the transparent plastic film is not formed, using the transparent conductive layer forming application liquid mainly composed of the conductive oxide particles and the binder, a second applied layer is formed by applying and drying by a method similar to the above and then, the second applied layer only or together with the above applied layer or the above transparent conductive layer, the above-mentioned compression processing is applied and then, the compression layer is cured so that the second transparent conductive layer can be formed.

The term "applied layer" in the present description is used with a meaning of a film obtained by applying and drying the transparent conductive layer forming application liquid, and the term "transparent conductive layer" is used with a meaning of a film finally obtained by using the transparent conductive layer forming application liquid. Therefore, the "transparent conductive layer" is used clearly separately from the "applied layer" of the transparent conductive layer forming application liquid.

The phosphor layer, the dielectric layer, and the rear electrode layer formed on the transparent conductive layer can be formed sequentially by the screen printing and the like. As a paste for applying (printing) and forming each layer of the phosphor layer, the dielectric layer, and the rear electrode layer, a commercially available paste can be used. The phosphor layer paste and the dielectric layer paste are obtained by dispersing phosphor particles and dielectric particles in a solvent containing a binder mainly composed of a fluorine rubber, respectively, and the rear electrode layer paste is obtained by dispersing conductive particles such as carbon particles and the like in a solvent containing a thermosetting resin binder.

Here, in forming the dispersion-type electroluminescent element by screen printing of the phosphor layer and the like on the transparent conductive layer, a release liner film (liner film that can be peeled off) in which a weak pressure-sensitive adhesive is applied on a thin transparent plastic film with the transparent conductive layer formed may be bonded so as to reinforce its strength. That is because since the thickness of the transparent plastic film is as thin as less than 50 μm, when each of the phosphor layer, the dielectric layer, and the rear electrode layer is printed on it as it is, not only that handling is not easy but the following problems might occur in the screen printing. That is, in the screen printing in general, using a suction stage with a large number of small-diameter holes, a pressure of the hole portion is reduced so as to fix the film, but if the film is thin, the film on the hole portion is deformed and hollowed due to the pressure reduction, which causes a trace of this hollow on the screen-printed film. By using a porous member at the suction stage, the above problem can be prevented, but since the device price is raised by that, it is not widely used in general. If the release liner film is bonded as mentioned above, rigidity of the film is raised and the above hollow is not caused, and uniformity of the printing is not impaired. The release liner film can be easily peeled off and removed after the manufacture of the dispersion-type EL element.

Since the transparent plastic film and the above release liner used in the present invention prevent shrinkage (dimensional change) and curling of the film by the heating processing in the manufacturing process of the dispersion-type EL element, they are preferably subjected to the heating processing at 130 to 150° C. in advance, which is a heat processing temperature of the manufacturing process of the dispersion-type EL element.

Major portions of the dispersion-type EL element are constituted by the above transparent conductive layer, the phosphor layer, the dielectric layer, and the rear electrode layer, but in the actual dispersion-type EL element, a collecting electrode (formed by silver paste) of the transparent conductive layer, a lead electrode (formed by silver paste) of the rear electrode layer, insulating protective coating (formed by insulating paste) for preventing short-circuit between electrodes, electric shock and the like are further formed.

The dispersion-type electroluminescent element of the present invention is excellent in flexibility as a dispersion-type EL element since the thickness of the transparent plastic film, which is a base film, is thin, and the element is applied as a light emitting element to be incorporated in a key input component of a device and enables obtainment of a favorable click feeling of a key operation without any special structure or devising of the key pad. Therefore, the element can be applied as a light emitting element to be incorporated in the key input component of a device such as a cellular phone, a remote controller, a portable information terminal and the like.

EXAMPLE

Examples of the present invention will be specifically described below, but the present invention is not limited to the examples. Also, the "%" in the text indicates "weight %" except for "%" of transmittance and haze value and a "part" indicates a "part by weight".

Example 1

Granular ITO particles with an average particle size of 0.03 μm (product name: SUFP-HX, by Sumitomo Metal Mining Co., Ltd.) in 36 g, methyl isobutyl ketone (MIBK) as a solvent in 24 g, and cyclohexanone as a solvent in 36 g are mixed and applied with dispersing processing and then, urethane acrylate ultraviolet-curable resin binder in 3.8 g and a photoinitiator (Darocur 1173) in 0.2 g are added and agitated well so as to obtain an transparent conductive layer forming application liquid in which the ITO particles with an average dispersed particle size of 130 nm are dispersed.

On one face of a PET film (by Teijin Limited, thickness of 25 μm) as a transparent plastic film, corona discharge treatment as adhesion-promoting treatment is applied and then, the transparent conductive layer forming application liquid is wire-bar-coated (wire diameter: 0.15 mm) and dried at 60° C. for one minute. Then, applying rolling processing by hard-chromium-plated steel rolls with a diameter of 100 mm (linear pressure: 200 kgf/cm=196 N/mm, nip width: 0.8 mm), the binder component is further cured (in nitrogen, 100 $mW/cm^2 \times 2$ seconds) by a high-pressure mercury lamp so as to form a transparent conductive layer (film thickness: 1.0 μm) constituted by the ITO particles and the binder closely packed on the PET film. The packing density of the conductive particles in the transparent conductive layer after the rolling processing is approximately 60 vol %.

As for the transparent plastic film, in order to prevent shrinkage (dimensional change) and curling of the film by the heating processing in the manufacturing process of the dispersion-type EL element, which will be described later, the heating processing at 130° C.×60 minutes is applied in advance, and then, the transparent conductive layer is formed on it.

The film characteristics of the transparent conductive layer are visible-light transmittance: 92.0%, haze value: 2.0%, surface resistivity: 525Ω/□. Since the surface resistivity is subjected to influence of ultraviolet irradiation at the binder curing and tends to lower temporarily immediately after the curing, measurement is made one day after the formation of the transparent conductive layer.

The transmittance and the haze value of the above-mentioned transparent conductive layer are the values only of the transparent conductive layer and acquired by the following calculation formulas 1 and 2, respectively:

Transmittance of the transparent conductive layer (%)=[(transmittance measured for the transparent plastic film on which the transparent conductive layer is formed)/transmittance of the transparent plastic film]×100 [Calculation formula 1]

Haze value of the transparent conductive layer (%)=(haze value measured for the transparent plastic film on which the transparent conductive layer is formed)−(haze value of the transparent plastic film) [Calculation formula 2]

The surface resistivity of the transparent conductive layer is measured by using a surface resistivity meter Loresta-AP (MCP-T400) by Mitsubishi Chemical Corporation. The haze value and the visible-light transmittance are measured by using a haze meter (HR-200) by Murakami Color Research laboratory Co., Ltd.

Next, on the PET film on which the transparent conductive layer is formed, a phosphor paste (by Dupont, 7154J) in which zinc sulfide particles, which are phosphor, are dispersed in a resin solution mainly composed of fluorine polymer is made, screen printing with a size of 4×5 cm using a 200-mesh polyester screen is applied, and it is dried at 120° C.×30 minutes so as to form the phosphor layer. Fixation of the transparent plastic film at the screen printing is made by a porous suction plate.

On the above phosphor layer, a dielectric paste (by Dupont, 7153) in which barium titanate particles are dispersed in a resin solution mainly made of fluorine polymer is prepared, screen printing with a size of 4×5 cm using a 200-mesh polyester screen is applied, and it is dried (120° C.×30 minutes), such a screen printing step and drying step are repeated twice so as to form the dielectric layer.

On the dielectric layer, a carbon conductive paste (by Fujikura Kasei Co., Ltd., FEC-198) is screen-printed with a size of 3.5×4.5 cm using a 200-mesh polyester screen, and it is dried at 130° C.×30 minutes so as to form a rear electrode layer.

On one ends of the transparent conductive layer and the rear electrode layer, an Ag lead for voltage application is formed using a silver conductive paste so as to have a dispersion-type EL element according to Example 1. In order to prevent short-circuit between electrodes, electric shock and the like, as insulating protective coating of the transparent conductive layer and the rear electrode layer, an insulating layer is formed using an insulating paste (by Fujikura Kasei Co., Ltd., XB-101G) as necessary, but since it is not a portion relating to the essentials of the present invention, the details are omitted.

When a voltage of 100V, 400 Hz is applied to between the leads for voltage application of the above dispersion-type EL element, the dispersion-type EL element uniformly emits light and its brightness measurement shows 53 Cd/m$^2$. The brightness is measured by a brightness meter (by Topcon Corporation, product name: BM-9).

Example 2

In Example 1, using the PET film with a thickness of 16 μm as the transparent plastic film, the transparent conductive layer (film thickness: 1.0 μm) constituted by the ITO particles and the binder closely packed on the PET film is formed. The packing density of the conductive particles in the transparent conductive layer after the rolling processing is approximately 60 vol %.

As for the transparent plastic film, similarly to Example 1, in order to prevent shrinkage (dimensional change) and curling of the film by the heating processing in the manufacturing process of the dispersion-type EL element, the heating processing at 130° C.×60 minutes is applied in advance, and then, the transparent conductive layer is formed on it.

The transparent conductive layer has visible-light transmittance: 92.2%, haze value: 1.8%, surface resistivity: 490Ω/□. The conditions other than them are similar to those of Example 1 so as to obtain the dispersion-type EL element according to Example 2.

When a voltage of 100V, 400 Hz is applied to between the leads for voltage application of the above dispersion-type EL element, the dispersion-type EL element uniformly emits light and its brightness measurement shows 52 Cd/m$^2$.

Example 3

In Example 2, on the face on which the transparent conductive layer of the PET film with the thickness of 16 μm with the transparent conductive layer is not formed, a release liner (liner film that can be peeled off) on which a heat resistant silicone weak pressure-sensitive adhesive is applied on the PET film with the thickness of 100 μm is bonded, and similarly to Example 2 except that a suction fixing plate having a large number of holes of approximately 0.5 to 1 mm is used at the screen printing of the manufacturing process of the dispersion-type EL element, the dispersion-type EL element according to Example 3 is obtained by peeling off the release liner after the dispersion-type EL element manufacturing process is finished.

In order to prevent shrinkage (dimensional change) and curling of the film by the heating processing in the manufacturing process of the dispersion-type EL element, the release liner is used after the heating processing at 130° C.×60 minutes is applied in advance.

When a voltage of 100V, 400 Hz is applied to between the leads for voltage application of the above dispersion-type EL element, the dispersion-type EL element uniformly emits light and its brightness measurement shows 52 Cd/m$^2$.

Example 4

On both faces of a PET film with a thickness of 16 μm as a transparent plastic film, corona discharge treatment as adhesion-promoting treatment is applied and then, the transparent conductive layer forming application liquid in Example 1 is wire-bar-coated (wire diameter: 0.075 mm) on one of the faces and dried at 60° C. for one minute and moreover, on the face opposite to the transparent plastic film, the transparent conductive layer forming application liquid is wire-bar-coated (wire diameter: 0.15 mm) and dried at 60° C. for one minute so as to obtain a transparent plastic film in which a dried coating film (applied layer and second applied layer) of the transparent conductive layer forming application liquid is formed on both surfaces. Then, rolling processing by hard-chromium-plated steel rolls with a diameter of 100 mm (linear pressure: 200 kgf/cm=196 N/mm, nip width: 0.8 mm) is applied to this transparent plastic film, the binder component is further cured (in nitrogen, 100 mW/cm$^2$×2 seconds) by a high-pressure mercury lamp so as to form a transparent conductive layer (film thickness: 1.0 μm) and a second transparent conductive layer (film thickness: 0.4 μm) on the both faces of the PET film constituted by the ITO particles and the binder closely packed. The packing density of the conductive particles in the transparent conductive layer after the rolling processing is approximately 60 vol %.

As for the transparent plastic film, in order to prevent shrinkage (dimensional change) and curling of the film by the heating processing in the manufacturing process of the dispersion-type EL element, which will be described later, the heating processing at 130° C.×60 minutes is applied in advance, and then, the transparent conductive layer is formed on it.

The film characteristics of the transparent conductive layer (the optical characteristics include those of the transparent conductive layer and the second transparent conductive layer) are visible-light transmittance: 88.5%, haze value: 3.6%, surface resistivity of the transparent conductive layer with the film thickness: 1.0 μm being 545Ω/□, while surface resistivity of the second transparent conductive layer with the film thickness: 0.4 μm being 1300Ω/□. Since the surface resistivity is subjected to influence of ultraviolet irradiation at the binder curing and tends to lower temporarily immediately after the curing, measurement is made one day after the formation of the transparent conductive layer.

On the transparent conductive layer with the film thickness: 1.0 μm, each layer is laminated similarly to Example 1 so as to obtain a dispersion-type EL element according to Example 4 having a second transparent conductive layer on the outer surface.

When a voltage of 100V, 400 Hz is applied to between the leads for voltage application of the above dispersion-type EL element, the dispersion-type EL element uniformly emits light and its brightness measurement shows 50 Cd/m$^2$.

Comparative Example 1

In Example 1, in the process for forming the transparent conductive layer, the transparent conductive layer (film thickness: 1.3 μm) constituted by the ITO particles and the binder not packed closely on the PET film is formed without conducting the rolling processing (linear pressure: 200 kgf/cm=196 N/mm). The packing density of the conductive particles in this transparent conductive layer is approximately 45 vol %.

The film characteristics of the transparent conductive layer are visible-light transmittance: 83.9%, haze value: 17.3%, surface resistivity: 15 KΩ/□. Since the surface resistivity is subjected to influence of ultraviolet irradiation at the binder curing and tends to lower temporarily immediately after the curing, measurement is made one day after the formation of the transparent conductive layer.

With the process similar to Example 1 except that the transparent plastic film on which the transparent conductive layer is formed is used, the dispersion-type EL element according to Comparative Example 1 is obtained.

When a voltage of 100V, 400 Hz is applied to between the leads for voltage application of the above dispersion-type EL element, light emission of the dispersion-type EL element is non-uniform and there is a portion with an extremely low brightness as approximately 30 Cd/m$^2$.

Comparative Example 2

In Example 1, using the PET film with the thickness of 100 μm as the transparent plastic film, the transparent conductive layer (film thickness: 1.0 μm) constituted by the ITO particles and the binder closely packed on the PET film is formed. The packing density of the conductive particles in the transparent conductive layer after the rolling processing is approximately 57 vol %.

The transparent conductive layer have visible-light transmittance: 92.0%, haze value: 2.2%, surface resistivity: 625Ω/□, Similarly to Example 1 except the above, the dispersion-type EL element according to Comparative Example 2 is obtained.

When a voltage of 100V, 400 Hz is applied to between the leads for voltage application of the above dispersion-type EL element, the dispersion-type EL element uniformly emits light and its brightness measurement shows 53 Cd/m$^2$.

Comparative Example 3

In Comparative Example 2, similarly to Example 1 except that instead of the PET film having the transparent conductive layer constituted by the ITO particles and the binder closely packed, a commercially available sputtered ITO film (visible-light transmittance: 92.0%, haze value: 0%, surface resistivity: 100Ω/□) in which the ITO layer is formed on the PET film (base film) with the thickness of 125 μm by sputtering method is used, the dispersion-type EL element according to Comparative Example 3 is obtained.

When a voltage of 100V, 400 Hz is applied to between the leads for voltage application of the above dispersion-type EL element, the dispersion-type EL element uniformly emits light and its brightness measurement shows 55 Cd/m$^2$.

The transmittance and the haze value of the above-mentioned sputtered ITO film are the values only of the ITO layer and acquired, respectively, by the following calculation formulas 3 and 4:

Transmittance of the ITO layer (%)=[(transmittance measured for the base film on which the ITO layer is formed)/transmittance of the base film]×100 [Calculation formula 3]

Haze value of the ITO layer (%)=(haze value measured for the base film on which the ITO layer is formed)−(haze value of the base film) [Calculation formula 4]

[Flexibility Evaluation of Dispersion-Type EL Element]

After the dispersion-type EL element according to each Example and each Comparative Example is wound around a rod with a diameter of 3 mm once each so that its light emitting face is faced inward and outward, respectively, a voltage of 100V, 400 Hz is applied to between the leads for voltage application of the dispersion-type EL element and a light emitting state of the element is observed. In each Example, no change is found in the light emitting state. With Comparative Example 2, because the thickness of the PET film as base material is as thick as 100 μm, it is difficult to wind it around the rod with the diameter of 3 mm, and when it is forced, a peeled-off portion is caused in apart of the element, which makes the light emission non-uniform. With Comparative Example 3, a crack is caused in the sputtered ITO layer, and almost no light is emitted from the element. Since Comparative Example 1 originally has non-uniform light emission, evaluation is not made.

[Solvent Resistance Evaluation of Transparent Conductive Layer]

In each Example, after the transparent conductive layer is formed on the surface of the transparent plastic film, the transparent conductive face is rubbed by a cotton swab dipped with acetone reciprocally ten times and the change in appearance is observed, but no change is found at all. The dispersion-type EL element is made using the evaluated transparent conductive layer and a voltage of 100V, 400 Hz is applied to between the leads for voltage application and the light emitting state of the element is observed, but light emission is uniform, including the portion rubbed by the cotton swab, and no influence by acetone is found.

What is claimed is:

1. A dispersion-type electroluminescent element made of at least a transparent conductive layer, a phosphor layer, a dielectric layer, and a rear electrode layer sequentially formed on a front face of a transparent plastic film, characterized in that a thickness of said transparent plastic film is less than 50 μm and said transparent conductive layer being mainly composed of conductive oxide particles dispersed in a binder and applied on the front face of the transparent plastic film, a packing density of the conductive oxide particles in the transparent conductive layer being at least 45 vol. %.

2. The dispersion-type electroluminescent element according to claim 1, wherein the transparent plastic film further has a back face opposite the front face of said transparent plastic film, a second transparent conductive layer being formed on the back face of the transparent plastic film, and said second transparent conductive layer being mainly composed of conductive oxide particles dispersed in a binder and applied on the back face of the transparent plastic film, the second transparent conductive layer on the back face of the transparent film defining a high packing density of the conductive oxide particles and few voids.

3. The dispersion-type electroluminescent element according to claim 1, wherein a thickness of said transparent plastic film is 25 μm or less.

4. The dispersion-type electroluminescent element according to claim 1, wherein said conductive oxide particles contain any one or more of indium oxide, tin oxide, and zinc oxide as its main component.

5. The dispersion-type electroluminescent element according to claim 4, wherein the conductive oxide particles mainly composed of said indium oxide is indium tin oxide particles.

6. The dispersion-type electroluminescent element according to claim 1, wherein said binder is cross-linkable, and said transparent conductive layer and a second transparent conductive layer have resistance against organic solvent.

7. A method for manufacturing a dispersion-type electroluminescent element, the method comprising:

- providing a transparent plastic film having opposite front and back faces;
- applying a transparent conductive layer forming application liquid mainly composed of conductive oxide particles and a binder on at least the front face of said transparent plastic film;
- applying compression processing to the transparent film with the transparent conductive layer forming application liquid thereon to reduce voids between the conductive oxide particles and to increase packing density of the conductive oxide particles to at least 45 vol. %;
- curing the compressed transparent conductive layer forming application liquid so as to form a transparent conductive layer;
- applying a release liner film with a weak pressure-sensitive adhesive in opposed relationship to the back face of the transparent plastic film;
- sequentially applying a phosphor layer, a dielectric layer and a rear electrode layer to the transparent conductive layer on the front face of the transparent plastic film; and
- peeling off the release liner to provide the dispersion-type electroluminescent element.

8. A dispersion-type electroluminescent element characterized in that the dispersion-type electroluminescent element according to claim 1 is applied as a light emitting element incorporated in a key input component of a device.

9. The dispersion-type electroluminescent element according to claim 8, wherein said device is a cellular phone, a remote controller, a portable information terminal.

10. The method for manufacturing a dispersion-type electroluminescent element according to claim 7, wherein said compression processing is conducted by rolling processing of metal rolls.

11. The method for manufacturing a dispersion-type electroluminescent element according to claim 7, wherein the step of applying a transparent conductive layer forming application liquid mainly composed of conductive oxide particles and a binder on at least the front face of said transparent plastic film further comprises applying on the back face of said transparent plastic film a second applied layer of the transparent conductive layer forming application liquid mainly composed of conductive oxide particles and a binder; applying compression processing to the transparent plastic film on which the transparent conductive layer and the second applied layer are formed; curing the compressed layers; and applying the release liner film with the weak pressure-sensitive adhesive to the second applied layer.

12. A method for manufacturing a dispersion-type electroluminescent element, the method comprising:

- providing a transparent plastic film having opposite front and back faces;
- applying a transparent conductive layer forming application liquid mainly composed of conductive oxide particles and a binder on the front and back faces of said transparent plastic film;
- applying compression processing to the transparent plastic film on which the transparent conductive layer forming application liquid has been applied to reduce voids between the conductive oxide particles and to increase packing density of the conductive oxide particles to at least 45 vol. % with few voids;
- curing the compressed layers to form transparent conductive layers;
- applying a release liner film with a weak pressure-sensitive adhesive to the transparent conductive layer on the back face of the transparent plastic film;
- sequentially applying a phosphor layer, a dielectric layer and a rear electrode layer to the transparent conductive layer on the front face of the transparent plastic film; and
- peeling off the release liner to provide the dispersion-type electroluminescent element.

13. The method for manufacturing a dispersion-type electroluminescent element according to claim 12, wherein said compression processing is carried out by rolling processing of metal rolls.

14. The method for manufacturing a dispersion-type electroluminescent element according to claim 13, wherein said rolling processing is carried out with a linear pressure: 29.4 to 490 N/mm (30 to 500 kgf/cm).

15. The dispersion-type electroluminescent element according to claim 1, wherein the packing density of the conductive particles in the transparent conductive layer is in a range of 55-80 vol. %.

* * * * *